Figure 1:
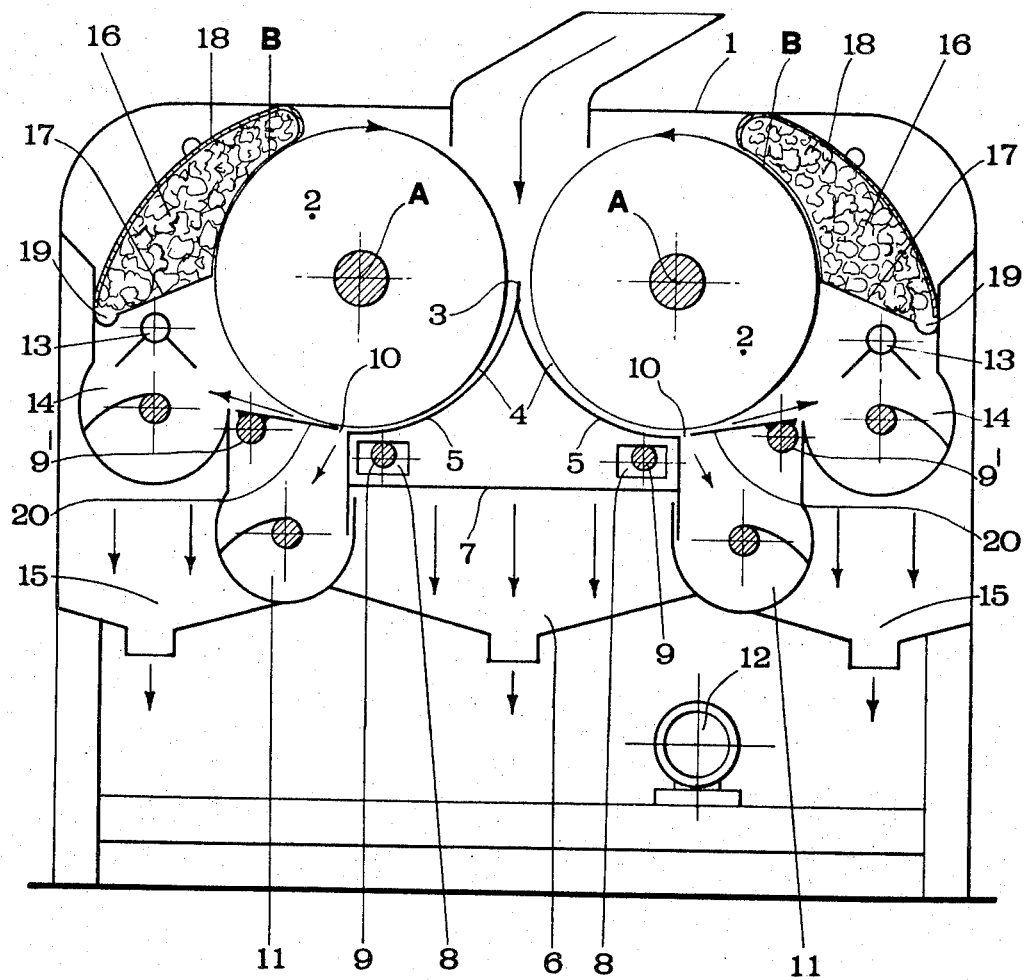

United States Patent [19]

Indelicato et al.

[11] 3,863,560

[45] Feb. 4, 1975

[54] MACHINE AND PROCESS FOR SIMULTANEOUSLY EXTRACTING THE JUICE AND ESSENTIAL OIL OF CITRUS FRUIT

[76] Inventors: Paolo Indelicato; Carmelo Indelicato, both of Via Finacchiaco, Aprile 110, Giarre, Catania, Italy

[22] Filed: June 26, 1973

[21] Appl. No.: 373,662

[30] Foreign Application Priority Data
Mar. 23, 1973  Italy .................................. 67840/73

[52] U.S. Cl. ................... 100/37, 100/39, 100/97, 100/105, 100/121, 100/174
[51] Int. Cl. ..................... A47j 19/02, B30b 9/02
[58] Field of Search ........... 100/121, 155, 156, 116, 100/112, 174, 177, 178, 37, 39, 105, 117, 98, 97; 99/496

[56] References Cited
UNITED STATES PATENTS

| | | | |
|---|---|---|---|
| 2,368,800 | 2/1945 | Bingenheimer | 100/105 X |
| 2,479,194 | 8/1949 | Eastman | 100/97 |
| 2,515,749 | 7/1950 | Wallace et al. | 100/97 |
| 3,103,239 | 9/1963 | Alexander et al. | 100/105 |
| 3,183,825 | 5/1965 | James | 100/105 X |

*Primary Examiner*—Peter Feldman
*Attorney, Agent, or Firm*—Maky, Renner & Jeffery

[57] ABSTRACT

A machine and process for simultaneously extracting the juice and essential oil of citrus fruit, comprising feeding the citrus fruit into a gap formed between a pair of parallel oppositely rotating cylinders, cutting the citrus fruit into halves by a cutting blade arranged in said gap, feeding and squeezing said halves along a narrowing gap formed between the periphery of each of said cylinders and an adjacent perforated metal sheet, collecting the juice below said perforated metal sheet, cutting the membranes and mesocarp of the citrus fruit from the peels, collecting the essential oil adhering to the peripheries of said cylinders by a pad of absorbent material and separately collecting the cut membranes and mesocarp and the cut peels.

7 Claims, 2 Drawing Figures

3,863,560

MACHINE AND PROCESS FOR SIMULTANEOUSLY EXTRACTING THE JUICE AND ESSENTIAL OIL OF CITRUS FRUIT

This invention relates to a machine and process for simultaneously extracting the juice and essential oil of citrus fruit and for simultaneously removing the mesocarp from the epicarp.

Machines for extracting the juice from citrus fruit are already known and machines for extracting the essential oil from citrus fruit are also known. These two types of machines occupy much space and perform two different working cycles, thus increasing production cost and reducing production output.

Machines for the continuous extraction of the juice and the essential oil from citrus fruit are also known. These machines comprise a combination of two units, i.e., an essential oil extractor and a juice squeezer, arranged in tandem or cascade fashion. Such a machine is described in Italian Pat. No. 912,325 filed on May 11, 1970 by the present applicants and issued on Mar. 15, 1972.

This invention provides an improved machine of the latter type in which the rasping unit for the extraction of the essential oil is eliminated. The invention also provides a new process for simultaneously extracting the juice and essential oil of citrus fruit with the aid of this improved machine. According to this process the whole citrus fruit is introduced between a pair of straight tubular adjacent cylinders having a vertical central cutting blade therebetween for cutting the citrus fruit into two halves which are fed and squeezed together with the peel by the cutting blade into two opposed gaps formed between the cutting blade and the periphery of the cylinders. The juice of the citrus fruit is collected in a basin located centrally below the two cylinders whereas the peel is squeezed and deformed in the progressively narrowing gaps to break up the oil vesicles contained in the outer surface of the peel or epicarp and thus extract the essential oil contained in those vesicles. The essential oil penetrates into the outer surface of the cylinders where it is retained due to its viscosity and the effect of the peel which acts as a screen. Located downstream of the narrowest portion of the gaps is a knife for separating the membranes from the mesocarp and the mesocarp from the peel. The mesocarp then drops into a conveyor screw collector arranged therebelow and the epicarp later drops into another conveyor screw collector, the collection of the mesocarp and epicarp being assisted by jets of water fed into the two collectors for washing the peels, membranes and mesocarps which together with the essential oil then form an emulsion which is fed to a centrifugal separator. Upstream of the screw conveyors along the periphery of the cyclinders there is located a pad or roller or absorbent material which is slightly biased against the periphery of the associated cylinder and absorbs the essential oil still adhering thereto, cleaning the cylinder and discharging the essential oil dripping from the absorbent material to an exhaust duct.

Figure 2:
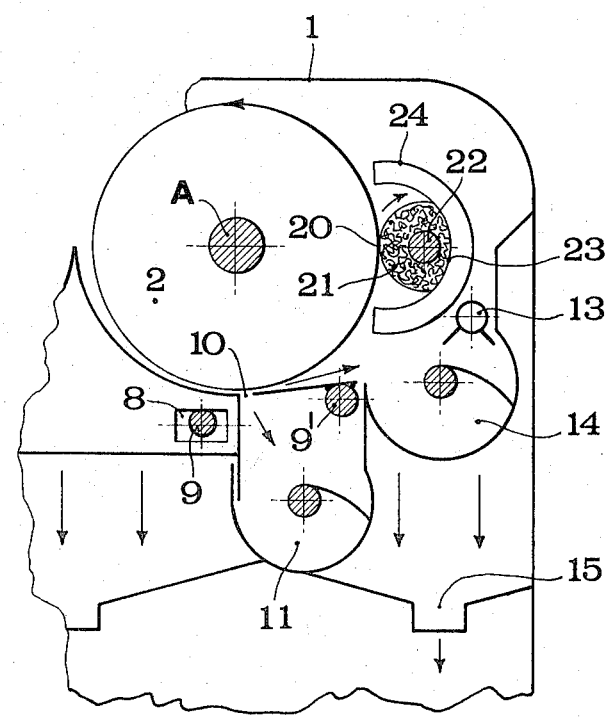

The preferred embodiments of the invention will now be described by way of example and with reference to the accompanying drawings in which:

FIG. 1 is a partially schematic cross-sectional view of a machine for extracting juice and essential oil of citrus fruit according to the invention, and FIG. 2 is a fragmentary view similar to a portion of FIG. 1, showing a modified form of absorbent material, mounted on a rotating roller positioned adjacent the rotating cylinder.

Referring to the drawing, the machine proposed by the present invention for simultaneously extracting the juice and essential oil of citrus fruit comprises a frame 1 supporting a pair of parallel adjacent straight tubular cylinders 2 mounted for idling movement in the frame 1, the peripheries of the cylinders 2 being spaced from each other by an amount slightly smaller than the diameter of the smallest citrus fruit to be treated. The axes A of the cylinders 2 are parallel and located in a horizontal plane and the peripheries of the cylinders 2 are rugged, for example, have outwardly projecting points produced by embossing or punching from inside, so that the citrus fruit is gripped by the cylinders and due to their rotation in opposite direction moved downwardly toward and through the center line therebetween where a vertical cutting blade 3 is arranged which intercepts the citrus fruit and cuts it into two halves. The two halves thus obtained are fed by the vertical cutting blade 3 in cooperation with the pair of rotating cylinders 2 into two opposed curved gaps 4 each forming a citrus fruit conveying channel. The inner surface of each of the gaps 4 is defined by the periphery of the cylinder 2 while the outer surface of each gap 4 is defined by a perforated metal sheet 5 which extends from the vertical cutting blade 3 downwardly in a curve which progressively approaches the periphery of the cylinder 2, so that the gap 4 is restricted in cross section toward its outlet end. Due to this restriction the mesocarp moved by the cylinders 2 is progressively crushed until all the juice is squeezed out of the citrus fruit halves. The juice passes through the holes in the perforated metal sheet 5 and is collected in a basin 6 arranged therebelow. Further, due to the deformation of the curvature of the citrus fruit peel the essential oil is also extracted.

The perforated metal sheet 5 is supported by a housing 7 having a pair of rectangular slots 8 extending in parallel to the axes of the cylinders 2. A pair of shafts 9 is located in the slots 8 and the latter have an upper surface supported by the shafts 9. The shafts 9 are mounted eccentrically with respect to their axle on the frame 1 of the machine. By rotating the eccentric shafts 9 the vertical position of the perforated metal sheet 5 and thus the width of the gap 4 along which the citrus fruit halves are moved can be adjusted. In this manner the width of the gap 4 can be adjusted to the thickness of the mesocarp so that the latter is completely squeezed out.

While the citrus fruit is being cut and squeezed the oil vesicles in the outer surface of the mesocarp are broken due to the deformation and flattening of the mesocarp. The oil flowing out of the vesicles penetrates into the outer surface of the cylinders 2 but remains between the epicarp and the cylinder surface. Thus the essential oil is extracted simultaneously with the cutting and squeezing of the citrus fruit.

The mesocarp from which the juice and essential oil has been removed arrives at the outlet 10 of the gaps 4 with the membranes still connected to the mesocarp. For detaching the membranes a pair of steel blades or knives 20 supported by shafts 9' are provided, the knives 20 being located with their cutting edge near the outlet opening 10 of the gaps 4 to remove the membranes from the mesocarp, if desired, together with a portion of the mesocarp itself. The shafts 9' are firmly secured to the knives 20 so that by rotating the shafts 9' the angle of incidence of the knives on the mesocarp can be adjusted, if desired even in such a manner that the knives do not even touch the mesocarp. A screw conveyor 11 is arranged below the opening 10 to receive the removed cellulose and mesocarp and discharge them from the machine.

A pump 12 is provided to feed jets of water through a pipe 13 to a second screw conveyor 14 for discharging the peels and also to the screw conveyor 11 for discharging the membranes and mesocarp. A basin 15 is arranged below the two screw conveyors 11 and 14 to collect the emulsion of essential oil and the water admitted for washing the peels, membranes and mesocarp, this emulsion being fed to a centrifugal separator (not shown).

Downstream of the knife 20 each of the cylinders 2 contacts a pad 16 of absorbent material slightly biased toward the periphery of the adjacent cylinder 2 along an arc B of the circumference of the cylinder and retained in position by a fixed wall 17 and a wall 18 which serves as a cover and can be opened to permit the absorbent material 16 to be exchanged.

So the essential oil on the outer surface of the cylinder 2 penetrates into and all over the abosorbent material 16 and when the absorbent material is saturated with essential oil the latter starts to drip down therefrom and is collected in an exhaust channel 19 provided on the wall 17 and is discharged out of the machine.

Alternatively, the pad 16 may be replaced by at least one roller of absorbent material, referring to roller 21 shown in FIG. 2. The roller 21 is mounted on a shaft 22 for rotation in a direction opposite to the direction of rotation of the adjacent cylinder 2 and engages the periphery of the latter under slight pressure.

During rotation of the cylinder 2 the essential oil on its outer surface penetrates into the absorbent material of the roller 21 at the pinch point 20. An arcuate collecting duct 24 is provided adjacent the roller 21 in a position opposite the pinch point 20 and engages the periphery of the roller 21 with a perforated inner surface 23 under a pressure sufficient to squeeze the essential oil out of the roller 21 and through the perforated inner surface 23 into the collecting duct 24 which conducts the essential oil out of the machine.

The machine and process according to the invention afford the following advantages:

a. The juice can be extracted from citrus fruit of any size.

b. The membranes and a portion of the mesocarp are cleaned.

c. The essential oil is extracted from the peel by deforming the latter rather than rasping it as in the conventional machines, together with the extraction of the juice. In this manner a better quality of the products is achieved.

d. The essential oil is obtained automatically without the use of water as a vehicle by means of the cylinders with associated absorbent foam material and simultaneously the peels, membranes and mesocarp are washed to extract the juice all with the use of only one relatively simple machine.

Altough a preferred embodiment of the invention has been described herein in detail and illustrated in the accompanying drawing it is to be understood that the invention is not limited to this precise embodiment and that numerous changes and modifications obvious to one skilled in the art may be made therein without departing from the scope of the invention.

We claim:

1. A machine for simultaneously extracting the juice and essential oil of citrus fruit, comprising a frame;

a pair of parallel straight tubular cylinders mounted horizontally for rotation in opposite directions on said frame;

said parallel straight tubular cylinders having rugged peripheries adapted to grip the citrus fruit and being separated from each other by a gap slightly smaller than the diameter of the smallest citrus fruit to be treated;

a vertical cutting blade arranged centrally in the gap between the pair of cylinders for cutting the citrus fruit into two halves;

a pair of perforated metal sheets each extending from said vertical cutting blade downwardly in a curve progressively approaching the periphery of an adjacent one of said pair of cylinders;

a juice collecting basin below said perforated metal sheets;

a first pair of conveyor screw collectors at the downstream end of said perforated metal sheets for collecting and discharging the cut membranes and mesocarp of the citrus fruit;

a knife at the downstream end of each of said perforated metal sheets for separating the membranes of the citrus fruit from the mesocarp;

absorbent material biased against the periphery of each of said cylinders in an upper portion thereof for collecting essential oil adhering to the periphery of said cylinders;

an essential oil exhaust channel at the lower end of said absorbent material;

a second pair of conveyor screw collectors adjacent said knives and cylinders for discharging the cut citrus fruit peels and an essential oil and water collecting basin below each of said second pair of conveyor screw collectors.

2. A machine as claimed in claim 1, further comprising a pump and pipe means for feeding water to each of said conveyor screw collectors to assist in discharging the membranes and mesocarp, and the peels, respectively, of the citrus fruit.

3. A machine as claimed in claim 1, wherein said perforated metal sheets are adjustably mounted to permit the width of the gap formed between each of said perforated metal sheets and an adjacent one of said pair of cylinders to be adjusted.

4. A machine as claimed in claim 1, wherein each of said knives is secured to a rotatable shaft so that the angle of incidence of the knife relative to the periphery of an adjacent one of said cylinders can be adjusted by rotating the shaft.

5. A machine as claimed in claim 1, wherein said absorbent material is arranged in a pad on a fixed wall mounted on said frame with one end thereof adjacent the periphery of each of said cylinders and supporting said pad of absorbent material from below while the top of said pad of absorbent material is retained by another wall serving as a cover adapted to be opened to permit the pad of absorbent material to be replaced.

6. A machine as claimed in claim 1, wherein said absorbent material is in the form of a roller of absorbent material rotatably mounted adjacent the periphery of each of said pair of cylinders.

7. A process for simultaneously extracting the juice and essential oil of citrus fruit, comprising the step of
feeding the citrus fruit into a gap formed between a pair of parallel straight tubular cylinders mounted horizontally for rotation in opposite directions;
cutting the citrus fruit into two halves by a vertical cutting blade arranged in the gap between said pair of cylinders;
feeding, deforming and squeezing the cut citrus fruit halves along a progressively narrowing gap formed between the periphery of each of said cylinders and an adjacent perforated metal sheet;
allowing the juice of the cut citrus fruit halves to pass through said perforated metal sheet and collecting the juice in a basin;
cutting the membranes and mesocarp from the peels of the citrus fruit halves and collecting and discharging the cut membranes and mesocarp;
collecting and discharging the cut peels separately;
collecting the essential oil adhering to the peripheries of said cylinders by a pad of absorbent material arranged adjacent said cylinders and collecting the essential oil dripping from said pad of absorbent material in an exhaust channel.

* * * * *